(12) United States Patent
Lin et al.

(10) Patent No.: US 8,356,348 B2
(45) Date of Patent: Jan. 15, 2013

(54) COMPUTER SYSTEM WITH ELECTRONIC LOCK

(75) Inventors: Jian-Jr Lin, Taipei (TW); Ke-Sen Huang, Ji-An Township, Hualien County (TW); Yi-Chan Teng, Yangmei Township, Taoyuan County (TW)

(73) Assignees: Inwellcom Technology., Co., Ltd, Taipei (TW); Jian-Jr Lin, Taipei (TW); Ke-Sen Huang, Hualien County (TW)

( * ) Notice: Subject to any disclaimer, the term of this patent is extended or adjusted under 35 U.S.C. 154(b) by 448 days.

(21) Appl. No.: 12/755,466

(22) Filed: Apr. 7, 2010

(65) Prior Publication Data

US 2011/0252471 A1   Oct. 13, 2011

(51) Int. Cl.
*G06F 21/00* (2006.01)

(52) U.S. Cl. .................................................. 726/20

(58) Field of Classification Search ..................... 726/20
See application file for complete search history.

(56) References Cited

U.S. PATENT DOCUMENTS

| 2003/0074575 A1* | 4/2003 | Hoberock et al. | 713/200 |
| 2007/0079134 A1* | 4/2007 | Tang et al. | 713/183 |
| 2007/0155363 A1* | 7/2007 | Rager et al. | 455/410 |
| 2011/0113235 A1* | 5/2011 | Erickson | 713/152 |
| 2011/0258690 A1* | 10/2011 | Gaffan et al. | 726/9 |

* cited by examiner

*Primary Examiner* — Jeffrey Pwu
*Assistant Examiner* — William Corum, Jr.
(74) *Attorney, Agent, or Firm* — Alan Kamrath; Kamrath IP Lawfirm, P.A.

(57) ABSTRACT

A computer system with an electronic lock includes an end-user unit and a mobile unit. The end-user unit has a communication port and an identification database coupling with the communication port and storing at least one identification code. The mobile unit has an identifying module with a logging code, with the mobile unit able to connect with the end-user unit through the communication port to connect the identifying module with the identification database of the end-user unit. When the mobile unit is coupled with the end-user unit, the end-user unit catches the logging code and executes an identifying process to determine whether the logging code is one of the at least one identification code in the identification database.

12 Claims, 6 Drawing Sheets

COMPUTER SYSTEM WITH ELECTRONIC LOCK

BACKGROUND OF THE INVENTION

1. Field of the Invention

The present invention relates to a computer system with an electronic lock and, particularly, to a computer system able to enhance information security and to store operation history by the electronic lock.

2. Description of the Related Art

With the general use of automatic computer systems, information security becomes a serious subject at the present day. Although many computer systems such as finance computer systems, personal data systems, military computer systems, and police computer systems provide access authority scales, a conventional guarding system using individual passwords is easy to be invaded through a stolen password. Besides, in this condition, the access of an invader is not easy to detect.

In detail, referring to FIG. 1, a conventional computer system implemented with a network usually links a server 92 and a plurality of users 93 through a gateway 91, to monitor the data in communication, scale the access authority, and limit use of specific information. However, through the internet, there are still some uncontrollable channels for invaders to access the server 92 without being blocked by the gateway 91, and this may lower the efficiency in information security of the computer system. Furthermore, a deliberate leaking in information performed by a permitted user of the computer system is also impossible to be detected or stopped, and this is usually an uncontrollable part of information security. Hence, there is a need to improve the conventional guarding system.

SUMMARY OF THE INVENTION

It is the primary objective of this invention to provide a computer system with an electronic lock that limits authority in use of an end-user unit passing an identifying process, to enhance performance in information security.

It is the secondary objective of this invention to provide a computer system with an electronic lock continuously controlling and recording operation of the computer system.

The computer system with an electronic lock in accordance with an aspect of the present invention comprises an end-user unit and a mobile unit. The end-user unit has a communication port and an identification database coupling with the communication port and storing at least one identification code. The mobile unit has an identifying module with a logging code, with the mobile unit able to connect with the end-user unit through the communication port to connect the identifying module with the identification database of the end-user unit. When the mobile unit is coupled with the end-user unit, the end-user unit catches the logging code and executes an identifying process to determine whether the logging code is one of the at least one identification code in the identification database.

In accordance with another aspect of the present invention, the computer system with an electronic lock comprises a server, an end-user unit, and a mobile unit. The server has an identification database storing at least one identification code. The end-user unit has a communication port in connection with the server. The mobile unit has an identifying module with a logging code, with the mobile unit able to connect with the end-user unit through the communication port to connect the identifying module with the identification database of the end-user unit. When the mobile unit is coupled with the end-user unit, the end-user unit catches the logging code and executes an identifying process to determine whether the logging code is one of the at least one identification code in the identification database.

Further scope of the applicability of the present invention will become apparent from the detailed description given hereinafter. However, it should be understood that the detailed description and specific examples, while indicating preferable embodiments of the invention, are given by way of illustration only, since various modifications will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 4b is a flow chart of accessing an end-user unit in accordance with the present invention, with the "a," "b" and "c" therein respectively connecting with the "a," "b" and "c" in FIG. 4a.

In the various figures of the drawings, the same numerals designate the same or similar parts.

DETAILED DESCRIPTION OF THE INVENTION

Please be noted that the terms, "connect" and "connection," shown hereinafter mean the way and the linkage for communicating information, which include both the wired and wireless ways generally used in the computer field.

Figure 1:
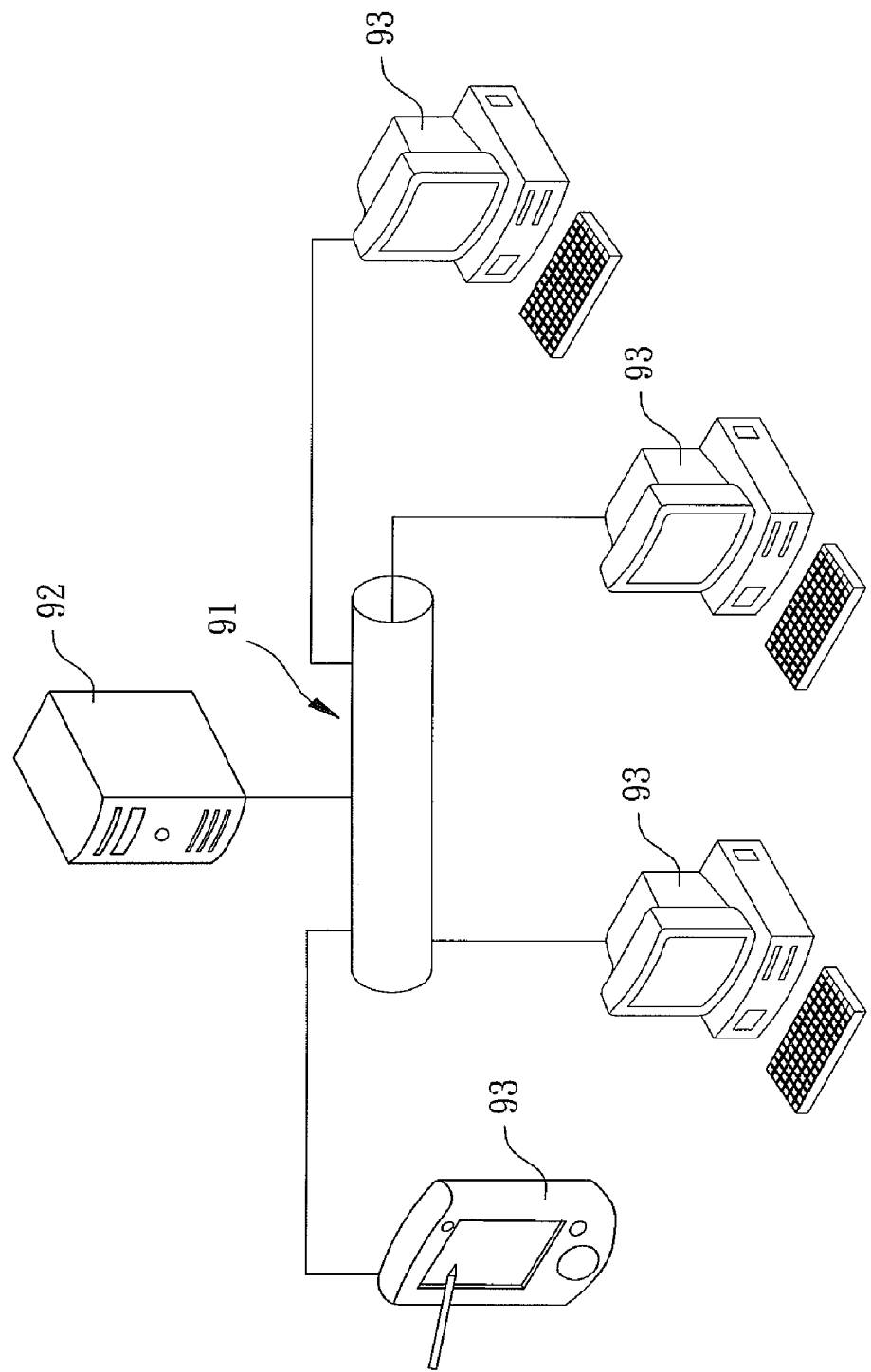
FIG. 1 is a network chart of a conventional computer system.
Figure 2:
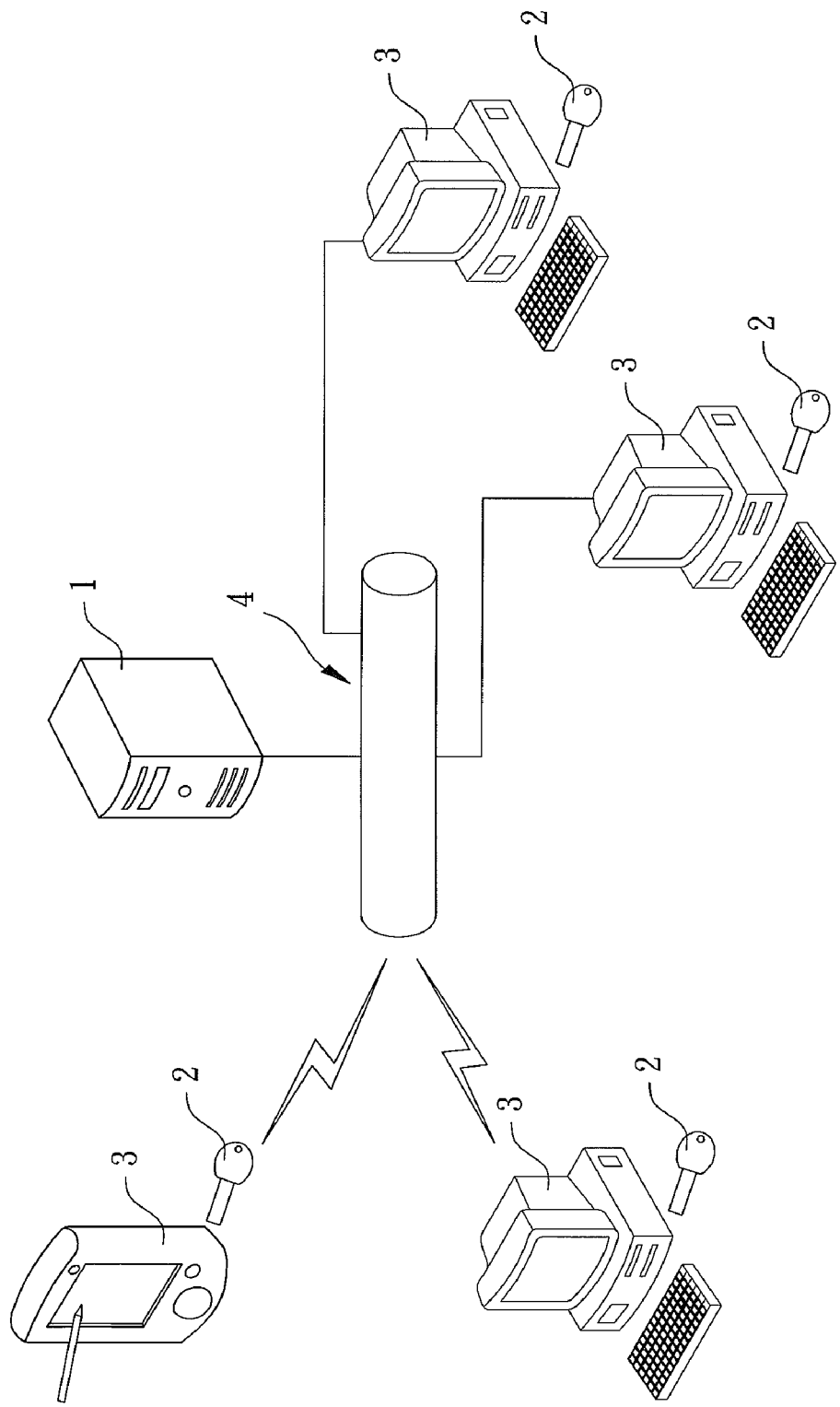
FIG. 2 is a network chart in accordance with a preferred embodiment of the present invention.

Now please refer to FIG. 2, which shows a computer system using an electronic lock of the present invention to enhance information security and to store operation history by the electronic lock. The computer system with the electronic lock has a structure of a server 1, a mobile unit 2 and an end-user unit 3, with data being transmitted between the server 1 and the end-user unit 3 through the mobile unit 2. Preferably, the server 1 connects with the mobile unit 2 in connection with the end-user units 3 through a gateway 4, so that the server 1 can collect information of the end-user unit 3 and thus monitor operation thereof. Besides, when there are two end-user units 3 in use, the server 1 can also be an interface between these two end-user units 3. The mobile unit 2 not only serves as an identification key for actuating and accessing certain predetermined functions of the end-user unit 3, but also records the operation history of the end-user unit 3 for monitor purposes. In detail, the mobile unit 2 has a communication port, preferably a universal serial bus (USB) port, to connect with the end-user unit 3. The end-user unit 3 also has a communication port corresponding to that of the mobile unit 2, and the end-user unit 3 can be a computer, a terminal, a personal digital assistant (PDA), a cell phone or the like.

Figure 3:
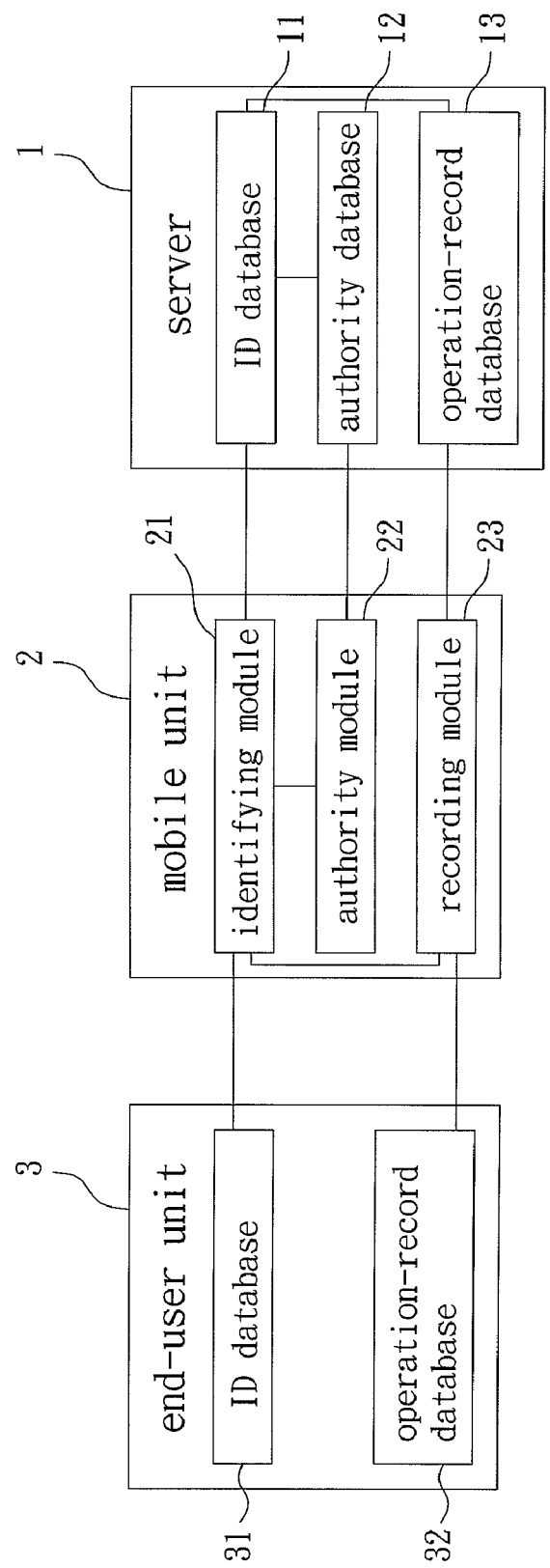
FIG. 3 is a block diagram in accordance with the preferred embodiment of the present invention.

Now, please refer to FIGS. 2 and 3. The server 1 includes an identification (ID) database 11, an authority database 12, and an operation-record database 13. The ID database 11 stores a plurality of identification codes serving as references for identifying the user who logins the present computer system. The authority database 12 connects with the ID database 11 and has limitation data respectively corresponding to the ID codes for storing the limitation in operation of the end-user unit 3. Specifically, according to the need, any stored ID code and limitation datum corresponding to each other can be cancelled, and a new pair of ID code and limitation datum can be added.

The operation-record database 13 connects with the ID database 11 and has history data respectively corresponding to the ID codes, so that the operation-record database 13 can store the operation history corresponding to one of the ID codes into a respective one of the history data. Therefore, through the operation-record database 13, the server 1 can provide the operation history of any user who logins the computer system by the respective ID code.

Referring to FIGS. 2 and 3 again, the mobile unit 2 of the present invention includes an identifying module 21, an authority module 22, and a recording module 23. The identifying module 21 connects with the ID database 11 when the mobile unit 2 couples to the end-user unit 3 and stores a logging code for the ID database 11 to execute an identifying process. Specifically, the server 1 firstly catches the logging code of the identifying module 21 through the gateway 4 and executes the identifying process to determine whether the logging code is one of the ID codes in the ID database 11. According to the result of the identifying process, the end-user unit 3 is available if the said result is positive, that is, the logging code is identical to one of the ID codes. In other words, for a normal use, the logging code stored in the identifying module 21 can be selected from one of the ID codes of the ID database 11, so that the end-user unit 3 is available for the keeper of the mobile unit 2, and the keeper will be refused once the ID code identical to the logging code is removed from the ID database 11.

Therefore, because the build-in logging code of the identifying module 21 is not easy to be stolen, a basic protection of the server 1 and end-user unit 3 can be achieved since a mobile unit 2 with an allowable logging code is necessary for accessing the server 1 through the end-user unit 3. Besides, by cancelling any of the ID codes of the ID database 11 if any mobile unit 2 with the logging code corresponding to the cancelled ID code is stolen, the problem due to a missing mobile unit 2 can be effectively curbed.

Furthermore, still referring to FIG. 3, in another example, the end-user unit 3 may also has another ID database 31 with a plurality of ID codes, and the ID database 31 coupling with the communication port of the end-user unit 3 is able to connect with the identifying module 21 when the mobile unit 2 is coupled with the end-user unit 3. Thereby, the end-user unit 3 can also process the identifying process if the logging code of the mobile unit 2 matches any one of the ID codes stored in the ID database 31. Accordingly, not only the server 1 can be protected from network intruders, but a limitation in use of the end-user unit 3 is also provided.

Besides, during operation of the end-user unit 3, the end-user unit 3 enters a rest mode. The end-user unit 3 makes no response to any command if the mobile unit 2 is removed from the end-user unit 3, and the end-user unit 3 will not leave the rest mode as long as the mobile unit 2 is not coupled therewith. Moreover, the server 1 is able to transmit the ID codes inside the ID database 11 to the ID database 31 of the end-user unit 3 through the gateway 4, so as to renew the ID codes stored in the ID database 31.

The authority module 22 connects with the identifying module 21 and is able to connect with the authority database 12 when the mobile unit 2 couples with the end-user unit 3. Specifically, the authority module 22 also has a plurality of limitation data respectively corresponding to the ID codes for storing the limitation in operation of the end-user unit 3, to forbid certain operations such as copying any data of the end-user unit 3 into a flash driver or any storage medium, linking websites with particular addresses, performing particular programs, and the like. Therefore, the use of the end-user unit 3 is efficiently controlled, and information security is thus effectively improved.

In other words, since the logging code matches one of the ID codes of the ID database 31, a limitation datum in the authority module 22 and corresponding to the matched ID code as well as the logging code can also be found. Thus, when the ID database 31 is arranged for the end-user unit 3 to execute the identifying process, use of the end-user unit 3 is limited even if the connection between the server 1 and the mobile unit 2 or between the server 1 and the end-user unit 3 is not built. Furthermore, once the mobile unit 2 connects with the server 1, the server 1 can renew the limitation data in the authority module 22 through the gate way 4 if any one of the limitation data in the authority database 12 is changed. Therefore, efficiency in updating of limitation data is improved.

The recording module 23 connects with the operation-record database 13 when the mobile unit 2 couples with the end-user unit 3 and connects with the server 1, to timely record the operation history and build a history datum. Accordingly, the server 1 may retrieve the history datum in the recording module 23 and store it in the operation-record database. The history datum may include certain operations of the end-user unit 3 such as actuating a printer, opening a window, performing a program, linking a website, and the situations of memory and specific data in the end-user unit 3. With the recording module 23, a history datum corresponding to one of the ID codes can be retrieved for the server 1 to store and monitor the operation history of the user who logins the computer system with this ID code. Besides, the server 1 may further obtain the contents on the screen of the end-user unit 3 for monitor purposes.

Referring to FIG. 3 again, in another embodiment, the end-user unit 3 further provides a operation-record database 32 connecting with the recording module 23 while the mobile unit 2 couples with the end-user unit 3. With this operation-record database 32, history data can still be kept inside the operation-record database 32 even if the end-user unit 3 is off line relative to the server 1 and be transmitted to the server 1 through the gateway 4 to update the data inside the operation-record database 13 once the linkage between the server 1 and end-user unit 3 is recovered.

Figure 4A:
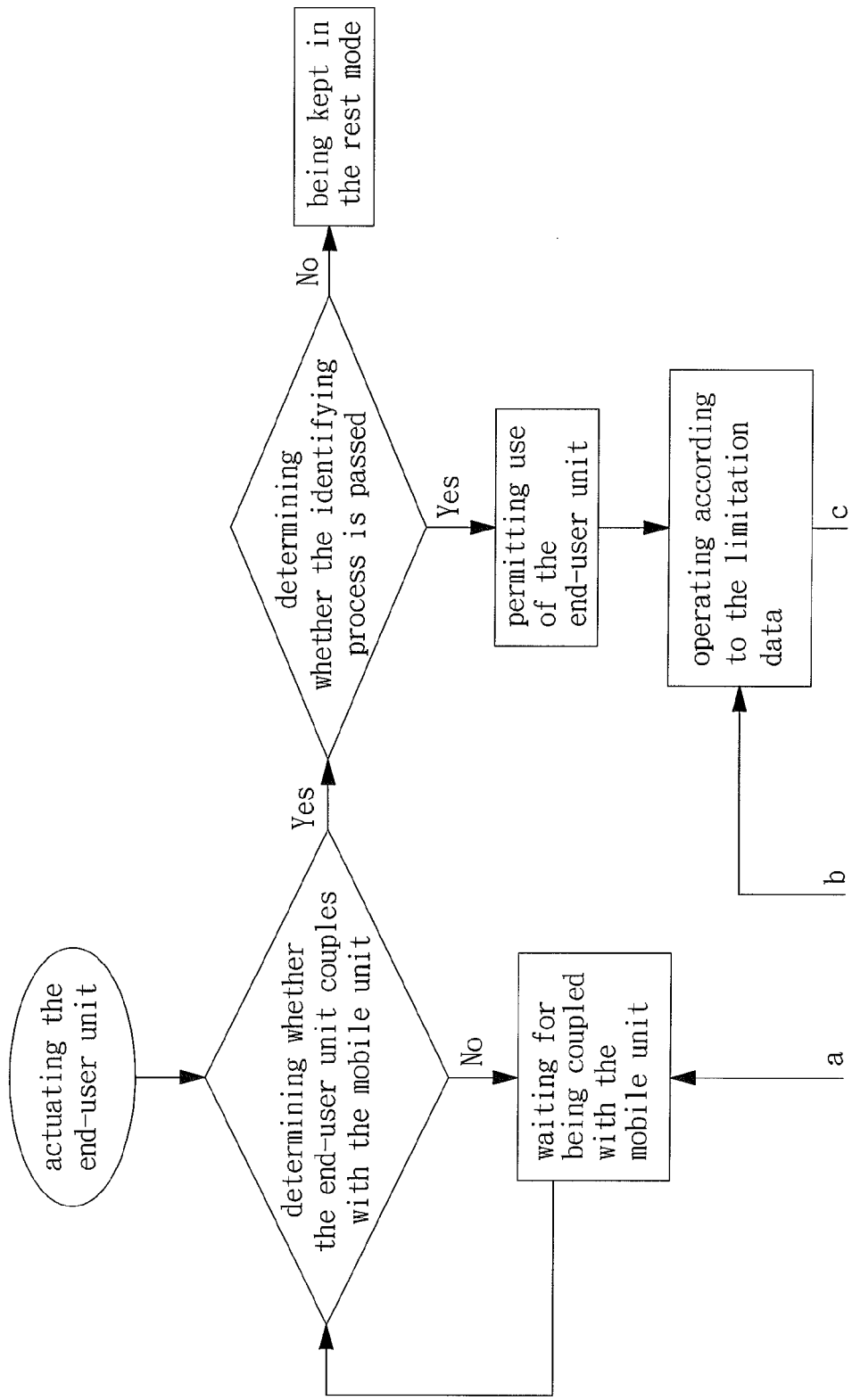
FIG. 4a is a flow chart of accessing an end-user unit in accordance with the present invention.
Figure 4B:
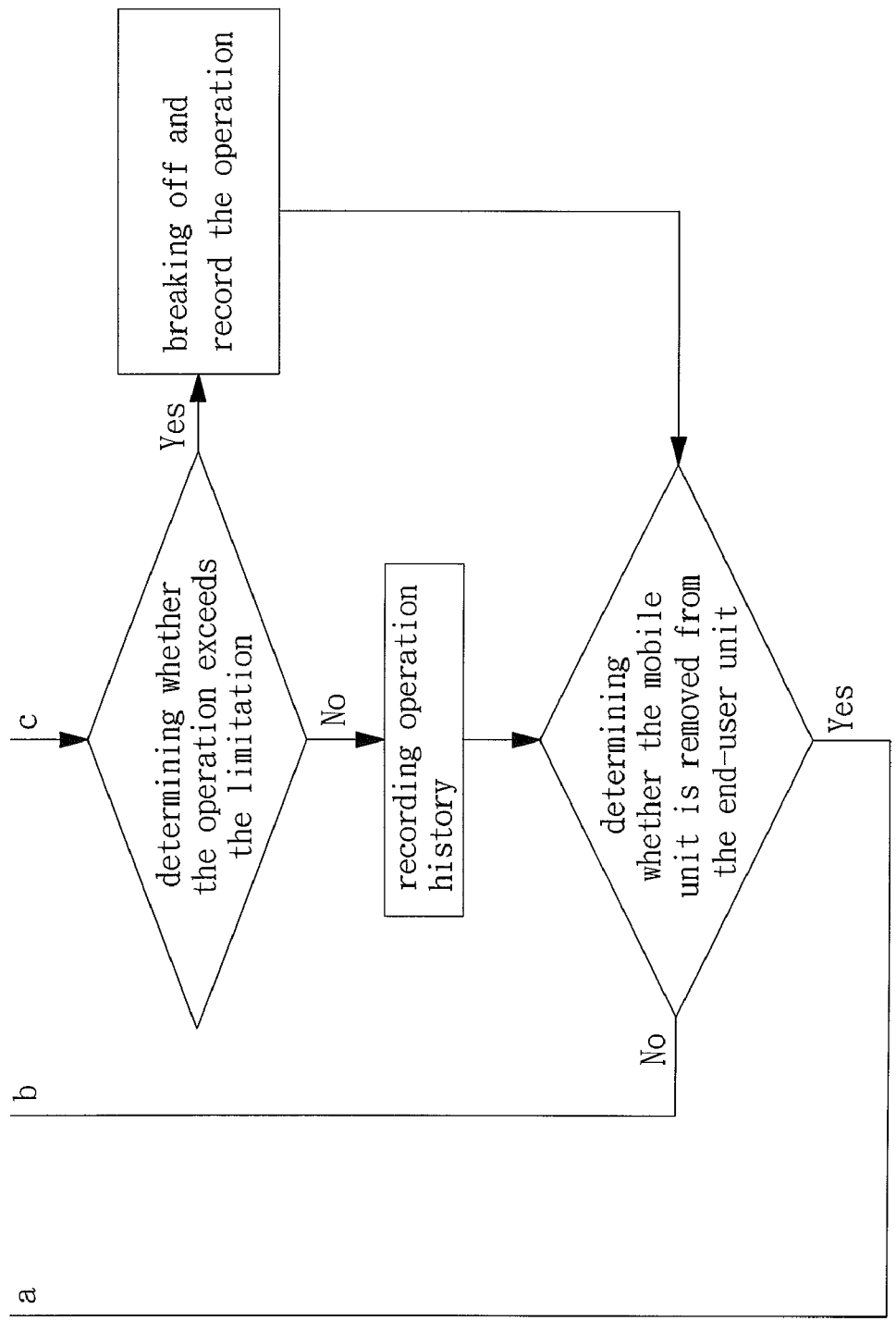

Now referring to FIGS. 3, 4a, and 4b, when the end-user unit 3 is operated, it firstly determines whether the mobile unit 2 connects with the end-user unit 3. If the mobile unit 2 is in connection therewith, the ID database 11 or 31 catches the logging code of the mobile unit 2 to execute the identifying process by the server 1 or the end-user unit 3. Otherwise, the end-user unit 3 keeps in the rest mode and forbids any use thereof. After passing through the identifying process, the end-user unit 3 coupled with the mobile unit 2 can be operated under limitations according to the limitation data stored in the authority module 22. However, if the logging code does not match any one of the ID codes in the ID database 11 or 31, the end-user unit 3 still forbids any use thereof.

Specifically, during operation of the end-user unit 3, the end-user unit 3 detects if any order or processing program exceeds the limitation corresponding to the limitation data, and deny or break off such an order or processing program if so. Moreover, the recording module 23 can also record the given order or processing program exceeding the limitation. The end-user unit 3 detects whether the mobile unit 2 is removed from the end-user unit 3 to determine if the end-user unit 3 can be further operated or has to execute the identifying process.

Figure 5:
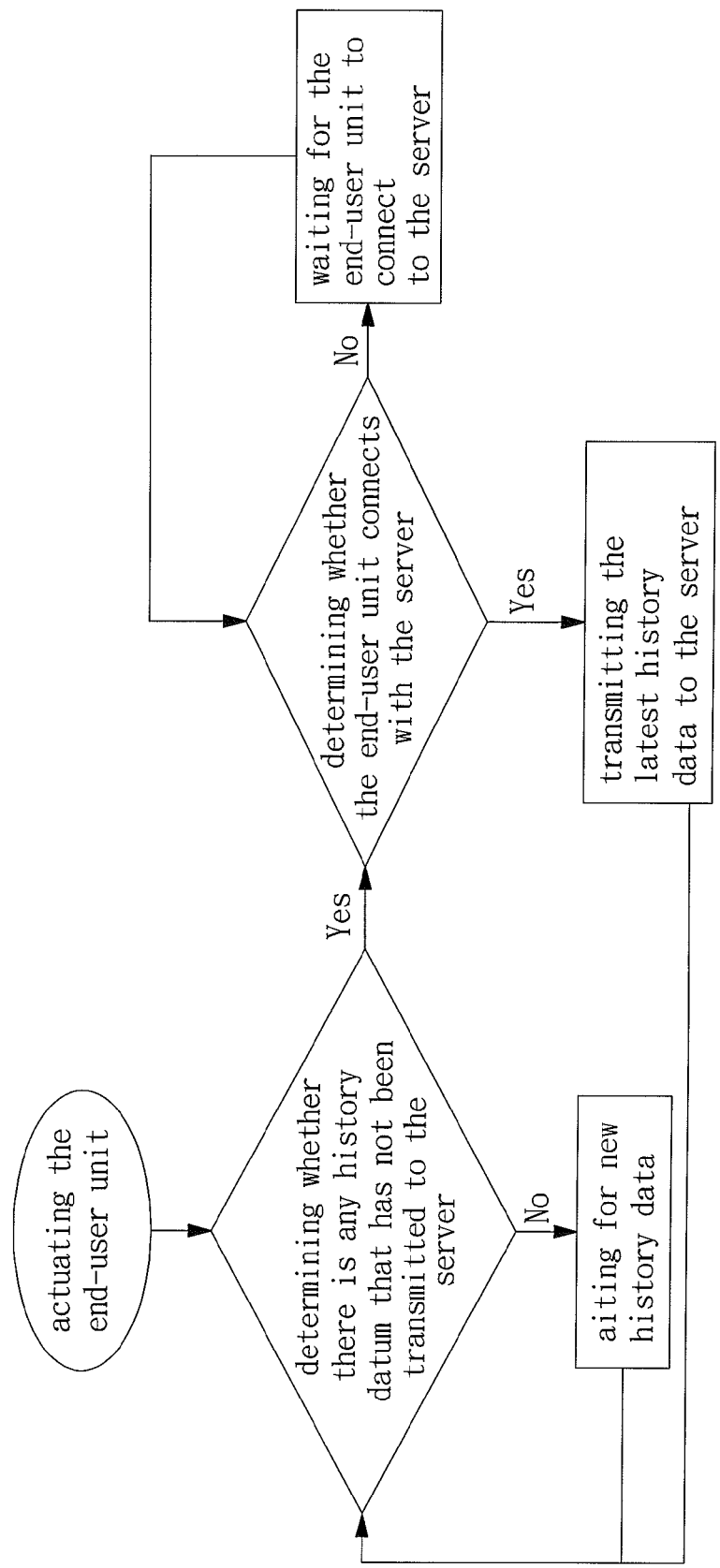
FIG. 5 is a flow chart of updating history data in accordance with the present invention.

Turning to FIG. 5 now, a flow chart for recording operation history of the present invention is shown. According to FIGS. 2, 3 and 5, when the end-user unit 3 coupled with the mobile unit 2 is in use, the end-user unit 3 determines if there is any history datum that has not been transmitted to the server 1. If there is at least one of un-transmitted history data, the end-user unit 3 connects with the server 1 to transmit the un-transmitted history data from the operation-record database 32 to the operation-record database 13 of the server 1. If there is none, the end-user unit 3 keeps on recording the operation history by the operation-record database 32.

In sum, what is characterized of this computer system with an electronic lock comprises the following feature. The identifying module 21 executes the identifying process; the authority module 22 limits operation of the end-user unit 3 according to the limitation datum; and the recording module 23 timely records operation history of the end-user unit 3 for the server 1 to monitor the operation of the end-user unit 3. Consequently, performance in information security and control of operation limitation are enhanced to efficiently manage use of the end-user unit 3.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A computer system with an electronic lock comprising:
an end-user unit having a communication port and an identification database coupling with the communication port and storing a plurality of identification codes; and
a mobile unit having an identifying module with a logging code, with the mobile unit connecting with the end-user unit through the communication port to connect the identifying module with the identification database of the end-user unit; wherein:
the mobile unit further comprises an authority module in connection with the identifying module,
with the mobile unit coupled with the end-user unit, the end-user unit catches the logging code and executes an identifying process to determine whether the logging code is one of the plurality of identification codes in the identification database, and
wherein the authority module has a plurality of limitation data corresponding to the plurality of identification codes, wherein each of the plurality of limitation data specifies at least one operation that a corresponding one of the identification codes performs on the end-user unit, wherein at least one allowable operation of the end-user unit is defined for each of the plurality of identification codes.

2. The computer system with an electronic lock as defined in claim 1, wherein the end-user unit further comprises an operation-record database in connection with the communication port and the identification database and has a plurality of history data corresponding to the plurality of identification codes for storing operation history of the end-user unit.

3. The computer system with an electronic lock as defined in claim 2, wherein the mobile unit further comprises a recording module in connection with the operation-record database when the mobile unit is coupled with the end-user unit, to build the plurality of history data.

4. A computer system with an electronic lock comprising:
a server having an identification database storing a plurality of identification codes;
an end-user unit having a communication port in connection with the server; and
a mobile unit having an identifying module with a logging code, with the mobile unit connected with the end-user unit through the communication port to connect the identifying module with the identification database of the end-user unit; wherein:
the mobile unit further comprises an authority module in connection with the identifying module,
with the mobile unit coupled with the end-user unit, the end-user unit catches the logging code and executes an identifying process to determine whether the logging code is one of the plurality of identification codes in the identification database, and
wherein the authority module has a plurality of limitation data corresponding to the plurality of identification codes, wherein each of the plurality of limitation data specifies at least one operation that a corresponding one of the identification codes performs on the end-user unit, wherein at least one allowable operation of the end-user unit is defined for each of the plurality of identification codes.

5. The computer system with an electronic lock as defined in claim 4, wherein the server further comprises an authority database in connection with the identification database and storing the plurality of limitation data corresponding to the plurality of identification codes for limiting operation of the end-user unit.

6. The computer system with an electronic lock as defined in Claim 4, wherein the end-user unit further comprises an identification database in connection with the communication port for connecting with the identifying module, with the identification database of the end-user unit also storing the plurality of identification codes.

7. The computer system with an electronic lock as defined in claim 6, wherein the server further comprises an operation-record database in connection with the identification database of the server and has a plurality of history data corresponding to the plurality of identification codes for storing operation history of the end-user unit.

8. The computer system with an electronic lock as defined in claim 7, wherein the mobile unit further comprises a recording module in connection with the operation-record database when the mobile unit is coupled with the end-user unit, to build the plurality of history data.

9. The computer system with an electronic lock as defined in claim 8, wherein the end-user unit further comprises an operation-record database in connection with the recording module and identification database of the end-user unit for storing the plurality of history data.

10. The computer system with an electronic lock as defined in claim 5, wherein the server further comprises an operation-record database in connection with the identification database of the server and has a plurality of history data corresponding to the plurality of identification codes for storing operation history of the end-user unit.

11. The computer system with an electronic lock as defined in claim 10, wherein the mobile unit further comprises a recording module in connection with the operation-record database when the mobile unit is coupled with the end-user unit, to build the plurality of history data.

12. The computer system with an electronic lock as defined in claim 11, wherein the end-user unit further comprises an operation-record database in connection with the recording module and identification database of the end-user unit for storing the plurality of history data.

* * * * *